UNITED STATES PATENT OFFICE.

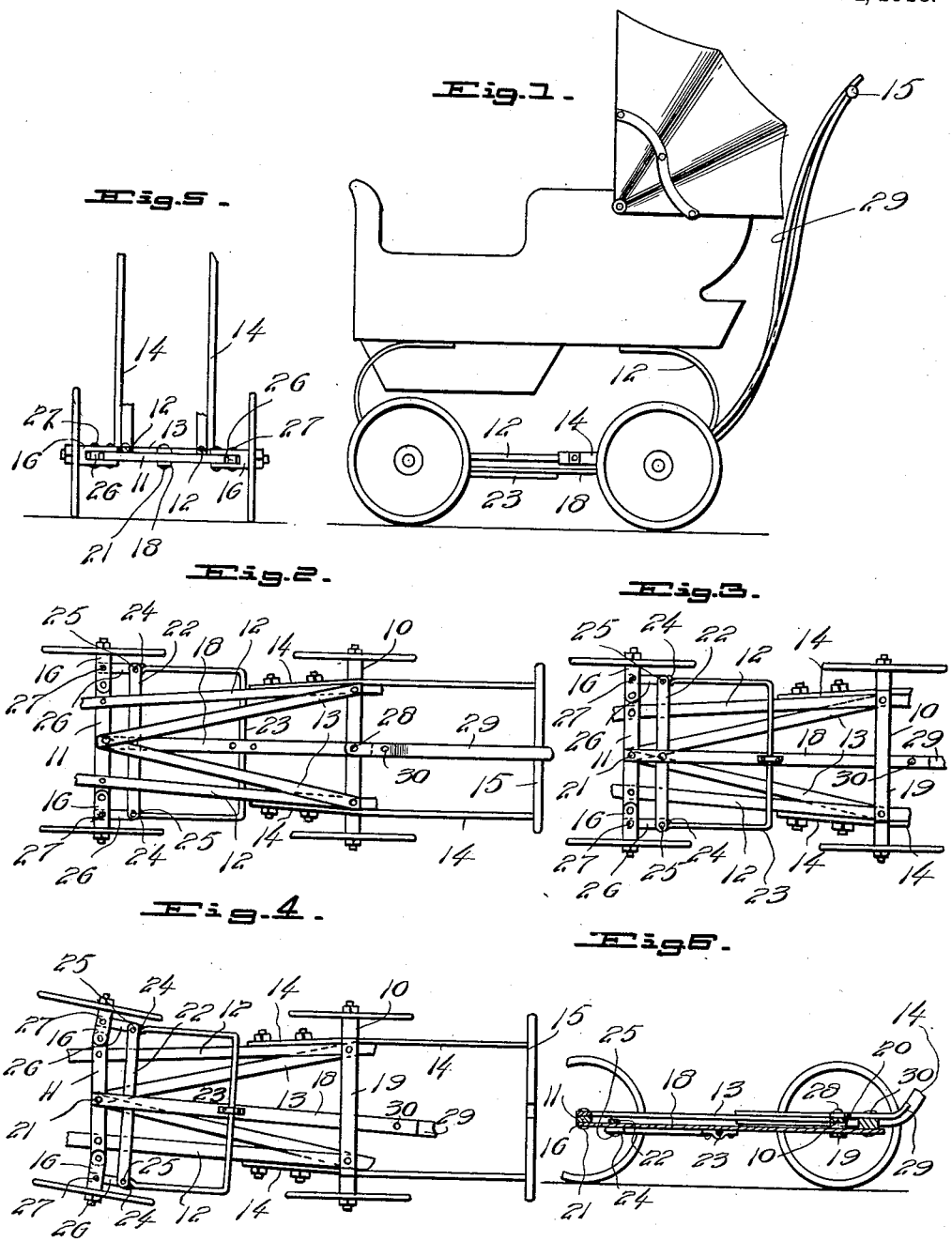

FREDERICK LEWIS MORING, JR., OF FORRESTON, ILLINOIS.

BABY-CARRIAGE.

1,077,422.  Specification of Letters Patent.  Patented Nov. 4, 1913.

Application filed May 7, 1913. Serial No. 766,045.

*To all whom it may concern:*

Be it known that I, FREDERICK LEWIS MORING, Jr., a citizen of the United States, residing at Forreston, in the county of Ogle, State of Illinois, have invented certain new and useful Improvements in Baby - Carriages; and I do hereby declare the following to be a full, clear, and exact description of the invention, such as will enable others skilled in the art to which it appertains to make and use the same.

This invention relates to baby carriages, and it more particularly relates to an improved steering gear therefor.

An object of the invention is to provide a simple, convenient and comparatively inexpensive steering mechanism which is applicable to baby carriages of ordinary construction.

Another object of the invention is to provide a steering mechanism of this character which is strong and durable, and which has a certain amount of resiliency, so as to prevent detriment to the carriage in case its front wheels collide with a solid and fixed object.

Other objects and advantages may be recited hereinafter and in the claims.

In the accompanying drawings, which supplement this specification: Figure 1 is a side elevation view of a complete baby carriage equipped with my improved steering gear. Fig. 2 is a top plan view of the frame or running gear of the carriage equipped with my improved steering gear. Fig. 3 is a bottom plan view of the structure illustrated in Fig. 2. Fig. 4 is a bottom plan view, similar to Fig. 3, except that the front wheels are held in turning position by the steering gear. Fig. 5 is a front elevation view of the frame and steering gear, and Fig. 6 is a longitudinal vertical section through the center of the frame and steering gear.

Referring to these drawings, in which similar reference characters correspond with similar parts, throughout the several views: The frame consists of the rear axle 10, the front axle 11, spring elements 12, and diagonal braces 13. The handle elements or shafts 14 are secured adjacent the spring elements 12 and extend rearward a sufficient distance to connect with the handle 15. The front axle or beam 11 is provided with pivotally mounted stub axles 16, these stub axles being preferably bifurcated, and the ends of the beam 11 are fitted between the furcations of the respective stub axles. A lever 18 is pivoted at the center of the axle 11 and extends thence rearwardly under and beyond the axle 10. A supporting and guiding member 19 is secured on the lower surface of the axle 10 and has its medial portion spaced apart to provide a slot or elongated aperture 20, in which the lever 18 is adapted to swing laterally on its pivot 21. This lever 18 has a cross beam 22 secured thereto and extending approximately equi-distantly therefrom in opposite directions, being substantially at right angles to said lever. A combined brace and spring element 23 has its middle portion secured adjacent to the middle portion of the lever 18, and has its ends formed with eyes 24 through which extend bolts or pivots 25, these bolts also extending through the apertured ends of the bar or beam 22 and through the apertured ends, respectively, of two links 26. These links have their rear ends pivotally engaged at 27 with the respective stub axles, said rear ends being seated between the furcations thereof. Pivotally mounted at 28 is a hand lever 29, and through the medial apertured portion of this lever extends a pivot 30 which also extends through or connects with the rear end of the lever 18. Any suitable catch as indicated, or otherwise, may be provided at the middle of the handle 15, for engagement with the rearwardly and forwardly extending end or handle element of the lever 29. The member 23 is adapted to yield slightly, being relatively rigid, so that the stub axles have their axes substantially in alinement but, in case one of the front wheels is struck against a curb, or other fixed and solid object, the spring element 23 will yield sufficiently to prevent undue shock to the carriage or the occupant thereof.

In operation, when it is desired to cause the carriage to travel leftward, instead of raising the front or rear wheels bodily, the lever 29 is moved rightward a sufficient distance for causing the carriage to travel in the desired arc or curve, and when it is desired to cause the carriage to travel in a straight course, it is only necessary to shift the lever to its medial position.

From the foregoing, it will be seen that I have provided a steering gear of this character which is fully capable of attaining the foregoing objects, in a thoroughly practical and efficient manner.

I do not limit my invention to the exact details of construction, combination and arrangement of parts, as herewith illustrated and described, but my invention may only be limited by a reasonable interpretation of the claims.

I claim:—

1. In a baby carriage, a frame consisting of a front axle, a rear axle, stub axles pivoted to the front axle, a lever pivoted to the front axle and extending rearward beyond the rear axle, a cross bar secured to the lever, links connecting the cross bar with the respective stub axles, and a lever pivoted to the rear axle and being connected with the rear end of the first said lever and adapted to be shifted laterally and to coact with the first said lever and with the cross beam and links for swinging the stub axles on their pivots.

2. In combination with the running gear of a vehicle having a rear axle and having a pair of pivotally mounted stub axles forwardly thereof, a lever pivotally mounted on the running gear and extending rearwardly, a cross beam pivotally mounted on the lever and having links connecting its ends with said stub axles, a U-shaped spring element having its middle portion secured to the lever and having its ends connected to the cross beam, and means pivoted on the first said axle and engaged with said lever whereby the latter may be swung on its pivot.

3. The combination in a baby carriage, of a rear axle, a forwardly disposed beam having stub axles pivoted thereto, brace members connecting the rear axle with said beam, a lever pivoted to said beam and extending rearwardly of said rear axle, a bar extending across said lever and having its middle portion secured thereto, links connecting the respective ends of the bar with the stub axles, a combined brace and spring element having its ends connected to said bar and having its middle portion connected to the said lever, a second lever pivoted to the rear axle and engaged with the rear end of the first said lever, and a handle extending into contiguity with the second said lever and having means thereon for engaging the latter for holding it in its normal position.

In testimony whereof, I affix my signature, in the presence of witnesses.

FREDERICK LEWIS MORING, Jr

Witnesses:
H. C. Drake,
Frederick Moring, Sr.,
Frank Wertz.

---

Copies of this patent may be obtained for five cents each, by addressing the "Commissioner of Patents, Washington, D. C."